Patented Aug. 8, 1944

2,355,423

UNITED STATES PATENT OFFICE 2,355,423

TRIAZINE DERIVATIVES

Gaetano F. D'Alelio and James W. Underwood, Pittsfield, Mass., assignors to General Electric Company, a corporation of New York No Drawing. Application June 19, 1942, Serial No. 447,731

17 Claims. (Cl. 260—249.5)

This invention relates to new chemical compounds and more particularly to triazine derivatives. The invention especially is concerned with the production of new and useful ketonic-substituted thio triazines.

The chemical compounds of this invention may be represented by the following general formula:

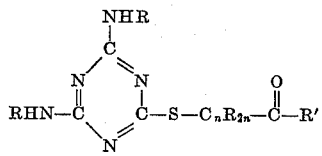

I

In the above formula $n$ represents an integer and is at least 1 and not more than 2, R represents a member of the class consisting of hydrogen and monovalent hydrocarbon and substituted hydrocarbon radicals, more particularly halo-hydrocarbon radicals, and R' represents a member of the class consisting of aryl radicals and substituted aryl radicals, more particularly halo-aryl radicals.

Illustrative examples of radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, ethallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, anthracyl, etc.); aliphatic-substituted aryl (e. g., tolyl, xylyl, ethylphenyl, propylphenyl, isopropylphenyl, allylphenyl, 2-butenylphenyl, tertiarybutylphenyl, etc.); aryl-substituted aliphatic (e. g., benzyl, phenylethyl, cinnamyl, phenylpropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals that R in the above formula may represent are: chloromethyl, chloroethyl, chlorophenyl, dichlorophenyl, ethyl chlorophenyl, chlorocyclohexyl, phenyl chloroethyl, bromoethyl, bromopropyl, fluorophenyl, iodophenyl, bromotolyl, etc.

Illustrative examples of aryl and substituted aryl radicals that R' in Formula I may represent are: phenyl, diphenyl, naphthyl, anthracyl, tolyl, xylyl, ethylphenyl, propylphenyl, isopropylphenyl, allylphenyl, 2-butenylphenyl, tertiary-butylphenyl, methylnaphthyl, iodophenyl, chlorophenyl, bromophenyl, fluorophenyl, chlorotolyl, chloroxylyl, dichlorophenyl, bromotolyl, propenylphenyl, etc.

Preferably R in Formula I is hydrogen. However, there also may be produced in accordance with the present invention compounds such, for instance, as those represented by the general formulas:

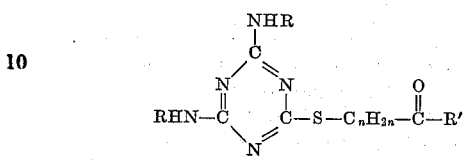

II and, more particularly,

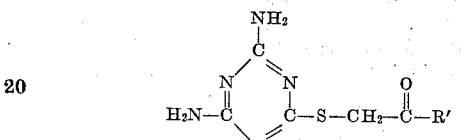

III and

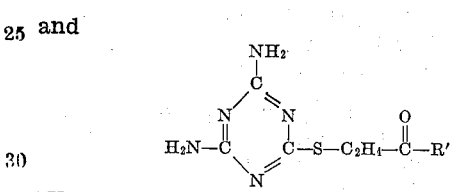

IV where $n$, R and R' have the same meanings as given above with reference to Formula I.

The new compounds of this invention may be used, for example, as pharmaceuticals, plasticizers and as intermediates in the preparation of derivatives thereof such as hydrazo, hydrazino, carbazido, semicarbazido, ureido, amidine, methylol, etc., derivatives of the individual compound embraced by Formula I. These new compounds are especially valuable in the preparation of synthetic resinous compositions. Thus, they may be condensed with, for instance, aldehydes, including polymeric aldehydes, hydroxylaldehydes and aldehyde-addition products, to yield condensation products of particular utility in the plastics and coating arts. Such condensation products are more fully described and are specifically claimed in our co-pending application Serial No. 447,730, filed concurrently herewith and assigned to the same assignee as the present invention. These new compounds also may be compounded with rubber, both natural and synthetic, to modify the properties of the rubber.

Various methods may be employed to produce the chemical compounds of this invention. We prefer to prepare them by effecting reaction, in the presence of a hydrohalide acceptor, between a mercapto (monomercapto) diamino s-triazine (symmetrical triazine) and a halogenated ketone corresponding to the formula

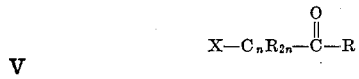

V where X represents a halogen atom and $n$, R and R' have the same meanings as given above with reference to Formula I.

Illustrative examples of mercapto diamino $[(-NHR)_2]$ s-triazines that may be employed, depending upon the particular end-product sought, are:

Mercapto diamino s-triazine (2-mercapto 4,6-diamino s-triazine; 4-mercapto 2,6-diamino s-triazine; 6-mercapto 2,4-diamino s-triazine)
2-mercapto 4,6-di-(methylamino) s-triazine
2-mercapto 4,6-dianilino s-triazine
2-mercapto 4,6-ditoluido s-triazine
2-mercapto 4,6-dixylidino s-triazine
2-mercapto 4-amino 6-ethylamino s-triazine
2-mercapto 4,6-di-(ethylamino) s-triazine
2-mercapto 4,6-di-(propylamino) s-triazine
2-mercapto 4,6-di-(isobutylamino) s-triazine
2-mercapto 4,6-di-(propenylamino) s-triazine
2-mercapto 4,6-di-(cyclopentylamino) s-triazine
2-mercapto 4,6-di-(benzylamino) s-triazine
2-mercapto 4,6-di-(phenethylamino) s-triazine
2-mercapto 4,6-di-(naphthylamino) s-triazine
2-mercapto 4-allylamino 6-butylamino s-triazine
2-mercapto 4-isobutylamino 6-cyclopentylamino s-triazine
2-mercapto 4-(3'-butenylamino) 6-isopropylamino s-triazine
2-mercapto 4-pentylamino 6-cyclohexylamino s-triazine
2-mercapto 4-methylamino 6-amino s-triazine
2-mercapto 4-anilino 6-amino s-triazine
2-mercapto 4-fluoranilino 6-amino s-triazine
2-mercapto 4-anilino 6-methylamino s-triazine
2-mercapto 4-methylamino 6-chloroethylamino s-triazine
2-mercapto 4,6-di-(iodoanilino) s-triazine
2-mercapto 4,6-di-(bromopropylamino) s-triazine
2-mercapto 4,6-di-(fluoroanilino) s-triazine
2-mercapto 4,6-di-(bromotoluido) s-triazine
2-mercapto 4-hexylamino 6-xenylamino s-triazine
2-mercapto 4-cyclohexenylamino 6-naphthylamino s-triazine
2-mercapto 4-chlorocyclopentylamino 6-toluido s-triazine
2-mercapto 4-bromotoluido 6-benzylamino s-triazine
2-mercapto 4-phenylchloroethylamino 6-phenethylamino s-triazine
2-mercapto 4-chloroanilino 6-ethylphenylamino s-triazine
2-mercapto 4-cycloheptylamino 6-isopropylphenylamino s-triazine
2-mercapto 4-propylanilino 6-phenylpropylamino s-triazine
2-mercapto 4-dichloroanilino 6-chloroethylamino s-triazine
2-mercapto 4-amino 6-bromoethylamino s-triazine
2-mercapto 4-amino 6-benzylamino s-triazine
2-mercapto 4-amino 6-xenylamino s-triazine
2-mercapto 4-amino 6-propylamino s-triazine
2-mercapto 4-amino 6-chloroethylamino s-triazine
2-mercapto 4-amino 6-naphthylamino s-triazine
2-mercapto 4-isobutylamino 6-neopentylamino s-triazine
2-mercapto 4-benzylamino 6-toluido s-triazine
2-mercapto 4-cyclohexylamino 6-xylidino s-triazine
2-mercapto 4-phenethylamino 6-chloropropylamino s-triazine Illustrative examples of halogenated ketones that may be used, depending upon the desired end-product, are:

Chloromethyl phenyl ketone
Bromoethyl phenyl ketone
Iodomethyl phenyl ketone
Chloromethyl tolyl ketones
Bromomethyl tolyl ketones
Iodomethyl tolyl ketones
Chloromethyl xylyl ketones
Chloromethyl naphthyl ketone
Bromomethyl xylyl ketones
Bromomethyl naphthyl ketone
Chloromethyl propenylphenyl ketones
Chloromethyl para-chloroxenyl ketone
Alpha-chloroethyl phenyl ketone
Beta-chloroethyl phenyl ketone
Alpha-bromoethyl phenyl ketone
Beta-bromoethyl phenyl ketone
Alpha-chloroethyl tolyl ketones
Alpha-bromoethyl tolyl ketones
Beta-chloroethyl tolyl ketones
Beta-bromoethyl tolyl ketones
Chloromethyl chlorophenyl ketones
Chloromethyl chlorotolyl ketones
Alpha-chloroethyl chlorophenyl ketones
Beta-chloroethyl fluorophenyl ketones
Bromomethyl bromophenyl ketones
Alpha-chloroethyl ethylphenyl ketones
Beta-bromoethyl ethylphenyl ketones
Alpha-bromoethyl bromophenyl ketones
Alpha-iodoethyl iodophenyl ketones
(Alpha-chloro beta-phenyl ethyl) phenyl ketone
(Beta-bromo alpha-ethyl ethyl) tolyl ketones
(Alpha-iodophenyl beta-propyl beta-chloro ethyl) phenyl ketone Various hydrohalide acceptors may be employed. We prefer to use a hydrohalide acceptor that will react with the mercapto triazine to form a water-soluble salt. Examples of such acceptors are the alkali-metal hydroxides, e. g., sodium hydroxide, potassium hydroxide, etc. Additional examples of hydrohalide acceptors that may be used are other inorganic bases, e. g., calcium hydroxide, barium hydroxide, ammonium hydroxide, etc.; carbonates of inorganic bases, including the carbonates of alkali metals; organic amines such as tertiary amines, e. g., trimethyl amine, triethyl amine, tributyl amine, pyridine, dimethyl aniline, quinoline, etc.; quaternary ammonium bases, e. g., tetramethyl ammonium hydroxide, etc.; and the like.

The reaction between the mercapto diamino s-triazine and the chosen halogenated ketone may be carried out in any suitable manner, but preferably is effected in the presence of a suitable solvent or mixture of solvents. Although various solvents and solvent mixtures may be employed, for economic reasons and because of their eminent suitability we prefer to use water or a mixture of water and alcohol. Instead of alcohol, other solvents may be employed, for instance dioxane. The reaction may be carried out under a variety of temperature and pressure conditions, for instance at normal, sub-normal or at elevated temperatures and at atmospheric, sub-atmospheric or super-atmospheric pressures.

The above reaction may be represented by the following general equation:

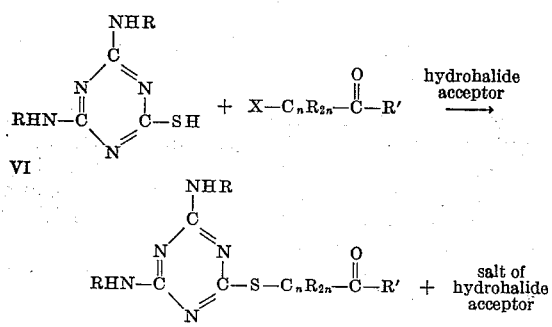

In the above equation X represents a halogen atom and $n$, R and R' have the same meanings as given above with reference to Formula I.

In order that those skilled in the art better may understand how the present invention may be carried into effect, the following examples are given by way of illustration. All parts are by weight.

*Example 1*

This example illustrates the preparation of (diamino s-triazinyl thio methyl) phenyl ketone, the formula for which is

VII $$H_2N-C \begin{array}{c} NH_2 \\ | \\ C \\ N \\ \end{array} C-S-CH_2-\overset{O}{\underset{\|}{C}}-C_6H_5$$

| | Parts |
|---|---|
| Thioammeline (mercapto diamino s-triazine) | 143.0 |
| Phenacyl chloride | 154.5 |
| Sodium hydroxide | 40.0 |
| Water | 500.0 |
| Alcohol | 500.0 |

The above-stated amounts of thioammeline and sodium hydroxide were dissolved in the mixture of the stated amounts of alcohol and water, yielding a clear solution. The phenacyl chloride was added to the resulting solution. The mix was stirred and allowed to react at room temperature for 24 hours, followed by heating under reflux at the boiling temperature of the mass for 1 hour. After cooling, the precipitate comprising (diamino s-triazinyl thio methyl) phenyl ketone was filtered off, washed and dried. A yield of 245 parts of washed and dried product was obtained. No attempt was made to obtain any more product from the mother liquor.

*Example 2*

| | Parts |
|---|---|
| Thioammeline | 143 |
| Para-chlorophenyl phenacyl bromide | 309 |
| Sodium hydroxide | 40 |
| Water | 2,000 |
| Alcohol | 2,000 |

The same procedure was followed as described under Example 1. A precipitate comprising (diamino s-triazinyl thio methyl) para-chloroxenyl ketone was filtered off, washed and dried. A yield of 350 parts of washed and dried product was obtained. No attempt was made to obtain any more produce from the mother liquor.

*Example 3*

The compound, [4,6-di-(methylamino) s-triazinyl-2 thio methyl] phenyl ketone, is produced in essentially the same manner as described under Example 1 with the exception that, instead of thioammeline, an equivalent amount of 2-mercapto 4,6-di-(methylamino) s-triazine is employed.

*Example 4*

The compound, [4,6-di-(ethylamino) s-triazinyl-2 thio methyl] para-chloroxenyl ketone, is produced in essentially the same manner as described under Example 2 with the exception that, instead of thioammeline, an equivalent amount of 2-mercapto 4,6-di-(ethylamino) s-triazine is employed.

*Example 5*

The compound, [alpha-(diamino s-triazinyl thio) ethyl] phenyl ketone, is prepared in essentially the same manner as described under Example 1 with the exception that, instead of phenacyl chloride, an equivalent amount of alpha-chloroethyl phenyl ketone is used.

Other examples of the chemical compounds of this invention are listed below:

[4,6-di-(methylamino) s-triazinyl-2 thio methyl] tolyl ketones

[4,6-di-(ethylamino) s-triazinyl-2 thio methyl] phenyl ketone

[4,6-di-(isobutylamino) s-triazinyl-2 thio methyl] phenyl ketone

[4,6-di-(propenylamino) s-triazinyl-2 thio methyl] phenyl ketone

[4,6-di-(cyclopentylamino) s-triazinyl-2 thio methyl]phenyl ketone (4,6-dianilino s-triazinyl-2 thio methyl) phenyl ketone (4,6-ditoluido s-triazinyl-2 thio methyl) phenyl ketone

[4,6-di-(naphthylamino) s-triazinyl-2 thio methyl] phenyl ketone (4,6-diamino s-triazinyl-2 thio methyl) bromotolyl ketones (4,6-diamino s-triazinyl-2 thio methyl) xylyl ketones (4,6-diamino s-triazinyl-2 thio methyl) ethylphenyl ketones (4,6-diamino s-triazinyl-2 thio methyl) naphthyl ketone (4,6-diamino s-triazinyl-2 thio methyl) propenylphenyl ketones (4,6-dianilino s-triazinyl-2 thio methyl) xenyl ketone

[4,6-di-(methylamino) s-triazinyl-2 thio methyl] propylphenyl ketones (4,6-dianilino s-triazinyl-2 thio methyl) chlorophenyl ketones

[Beta-(diamino s-triazinyl thio) ethyl] phenyl ketone (Diamino s-triazinyl thio methyl) chlorophenyl ketones (Diamino s-triazinyl thio methyl) bromophenyl ketones (Diamino s-triazinyl thio methyl) iodophenyl ketones (Diamino s-triazinyl thio methyl) fluorophenyl ketones

[4,6-di-(propylamino) s-triazinyl-2 thio ethyl] phenyl ketones

[4,6-di-(fluoroanilino) s-triazinyl-2 thio ethyl] phenyl ketones

[Alpha-(diamino s-triazinyl thio) ethyl] tolyl ketones

[Alpha-(diamino s-triazinyl thio) ethyl] chlorotolyl ketones
[Beta-(diamino s-triazinyl thio) ethyl] tolyl ketones
[Beta-(diamino s-triazinyl thio) ethyl] bromotolyl ketones
[Alpha-(diamino s-triazinyl thio) ethyl] naphthyl ketone
[Beta-(diamino s-triazinyl thio) ethyl] anthracyl ketone
[Alpha-(diamino s-triazinyl thio) ethyl] iodotolyl ketones
(4-methylamino 6-amino s-triazinyl-2 thio methyl) phenyl ketone
(4-anilino 6-methylamino s-triazinyl-2 thio methyl) phenyl ketone
[Alpha-ethyl beta-(diamino s-triazinyl thio) ethyl] phenyl ketone
[Beta-phenyl alpha-(dianilino s-triazinyl thio) ethyl] tolyl ketones
[4,6-di-(bromoethylamino) s-triazinyl-2 thio methyl] phenyl ketone
[4,6-di-(iodoanilino) s-triazinyl-2 thio methyl] tolyl ketones In a manner similar to that described above with particular reference to the diamino [(—NHR)₂] ketonic-substituted s-triazines, corresponding derivatives of the asymmetrical and vicinal triazines may be prepared. It also will be understood by those skilled in the art from the foregoing description of the preparation of a monothio triazine derivative that similar compounds may be prepared in which two or three sulfur atoms are attached directly to a carbon atom of the triazine nucleus and which have attached to each sulfur atom a —C$_n$R$_{2n}$—COR' grouping, where $n$, R and R' have the same meanings as given above with reference to Formula I.

The compounds of the present invention are not the equivalent of, and therefore are not to be confused with, compounds produced by condensing thioammeline in alkaline solution with a halogenated ketone corresponding to the formula X—CH₂—CO—CH₂—R wherein X represents a halogen atom and R represents a member of the group consisting of hydrogen and lower alkyl radicals, more particularly methyl, ethyl, propyl and butyl radicals.

What we claim as new and desire to secure by Letters Patent of the United States is:

1. Chemical compounds corresponding to the general formula

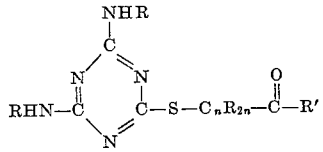

where $n$ represents an integer and is at least 1 and not more than 2, R represents a member of the class consisting of hydrogen and monovalent hydrocarbon and halo-hydrocarbon radicals, and R' represents a member of the class consisting of aryl and halo-aryl radicals.

2. Chemical compounds as in claim 1 wherein R represents a hydrogen atom.

3. Chemical compounds as in claim 1 wherein R' represents a phenyl radical.

4. Chemical compounds as in claim 1 wherein R represents a hydrogen atom and R' represents a phenyl radical.

5. Chemical compounds corresponding to the general formula

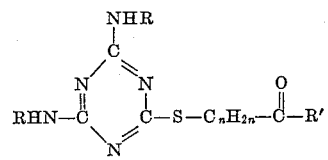

where $n$ represents an integer and is at least 1 and not more than 2, R represents a member of the class consisting of hydrogen and monovalent hydrocarbon and halo-hydrocarbon radicals, and R' represents a member of the class consisting of aryl and halo-aryl radicals.

6. Chemical compounds corresponding to the general formula

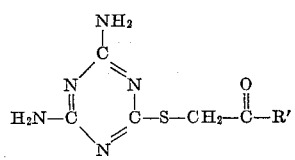

where R' represents a member of the class consisting of aryl and halo-aryl radicals.

7. Chemical compounds corresponding to the general formula

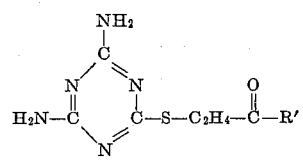

where R' represents a member of the class consisting of aryl and halo-aryl radicals.

8. A (diamino s-triazinyl thio methyl) aryl ketone.

9. (Diamino s-triazinyl thio methyl) phenyl ketone.

10. A (diamino s-triazinyl thio methyl) haloaryl ketone.

11. (Diamino s-triazinyl thio methyl) parachloroxenyl ketone.

12. A (diamino s-triazinyl thio ethyl) aryl ketone.

13. A (diamino s-triazinyl thio ethyl) phenyl ketone.

14. The method of preparing chemical compounds corresponding to the general formula

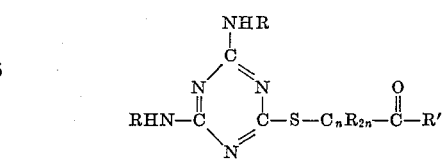

where $n$ represents an integer and is at least 1 and not more than 2, R represents a member of the class consisting of hydrogen and monovalent hydrocarbon and halo-hydrocarbon radicals, and R' represents a member of the class consisting of aryl and halo-aryl radicals, said method comprising effecting reaction, in the presence of a hydrohalide acceptor, between (1) a mercapto triazine corresponding to the general formula

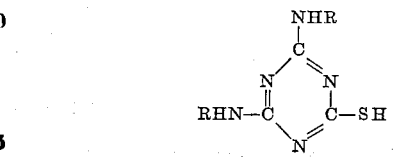

where R has the meaning above given, and (2) a halogenated ketone corresponding to the general formula

where X represents a halogen atom, and $n$, R and R' have the meanings above given.

15. A method as in claim 14 wherein the hydrohalide acceptor is an alkali-metal hydroxide.

16. The method of preparing (diamino s-triazinyl thio methyl) phenyl ketone which comprises effecting reaction, in the presence of an alkali-metal hydroxide, between thioammeline and phenacyl chloride.

17. The method of preparing (diamino s-triazinyl thio methyl) para-chloroxenyl ketone which comprises effecting reaction, in the presence of an alkali-metal hydroxide, between thioammeline and para-chlorophenyl phenacyl bromide.

GAETANO F. D'ALELIO.
JAMES W. UNDERWOOD.

CERTIFICATE OF CORRECTION.

Patent No. 2,355,423. August 8, 1944.

GAETANO F. D'ALELIO, ET AL.

It is hereby certified that error appears in the printed specification of the above numbered patent requiring correction as follows: Page 1, second column, line 45, for "hydroxylaldehydes" read --hydroxyaldehydes--; page 2, first column, line 10, last portion of the formula, for "R" read --R'--; and second column, line 65, for "manne" read --manner--; and that the said Letters Patent should be read with this correction therein that the same may conform to the record of the case in the Patent Office.

Signed and sealed this 26th day of September, A. D. 1944.

Leslie Frazer (Seal)            Acting Commissioner of Patents.